Dec. 2, 1969  J. F. SCHEFFER ET AL  3,481,512
HOPPER DISCHARGE RATE CONTROL
Filed Nov. 3, 1967  2 Sheets-Sheet 1
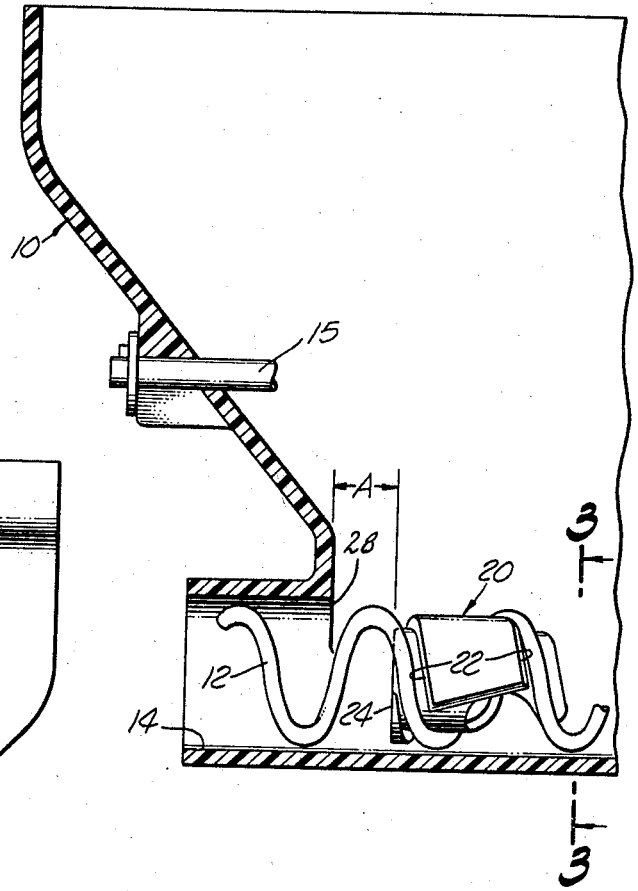
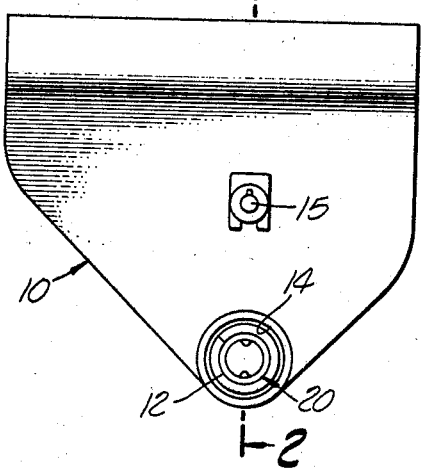
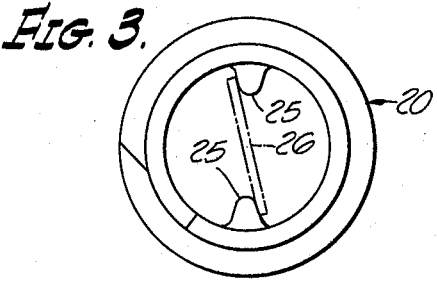
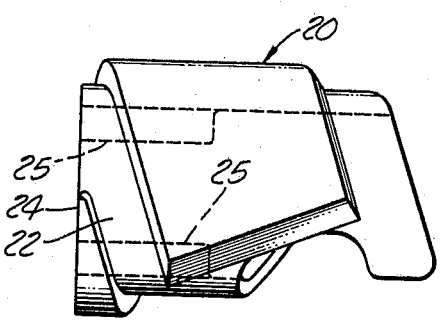
JOSEPH F. SCHEFFER
BILLIE G. NAIL
INVENTORS.
BY Paul A. Weilein
ATTORNEY

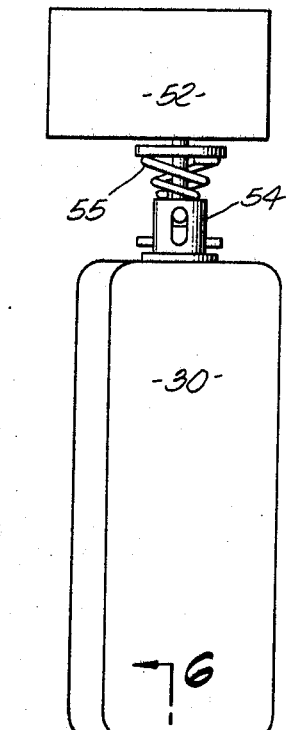
FIG. 5.
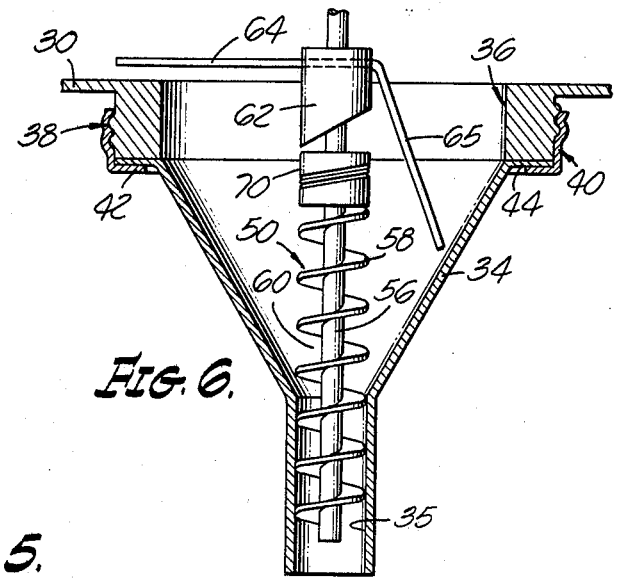
FIG. 6.
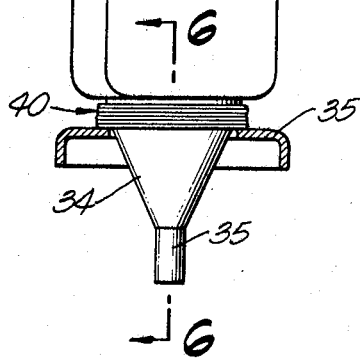
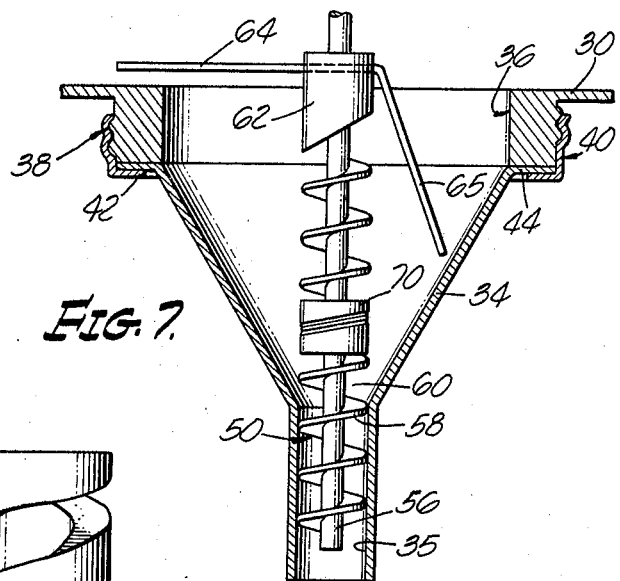
FIG. 7.
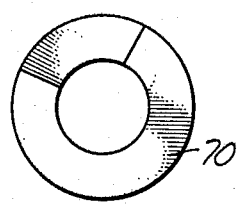
FIG. 8.   FIG. 9.
JOSEPH F. SCHEFFER
BILLIE G. NAIL
INVENTORS.
BY Paul A. Weilein
ATTORNEY

United States Patent Office 3,481,512
Patented Dec. 2, 1969

3,481,512
HOPPER DISCHARGE RATE CONTROL
Joseph F. Scheffer, Covina, and Billie G. Nail, La Crescenta, Calif., assignors to Columware, Inc., Lynwood, Calif., a corporation of California
Filed Nov. 3, 1967, Ser. No. 680,466
Int. Cl. G01f 11/24; B65g 47/16
U.S. Cl. 222—413                13 Claims

ABSTRACT OF THE DISCLOSURE

A hopper for dispensing a finely divided material, such as powdered chocolate, has a tubular discharge port with a conveyor screw extending into the port. A member to regulate the rate of discharge is mounted on the conveyor screw for axial adjustment by screw action along the conveyor screw and the rate at which the material enters the discharge port is determined by the clearance space between the regulator member and the entrance of the port. The material that is discharged gravitates into the discharge port for engagement by the conveyor screw therein and the regulator member serves its purpose by variably restricting the rate of gravitational movement of the material into the discharge port.

BACKGROUND OF THE INVENTION

Powdered chocolate is commonly discharged from a closed container by a power actuated dispensing mechanism for the purpose of providing the powdered ingredient required to make a hot or cold chocolate drink. One type of dispensing container is a horizontal hopper with convergent longitudinal bottom walls forming a valley for a motor driven conveyor screw which extends into a tubular discharge port at one end of the hopper. The conveyor screw may be a polished metal rod formed into a helical coil configuration. Another type is a vertically positioned canister with a conical bottom leading to a tubular discharge port and with a motor driven conveyor screw extending into the discharge port. To keep material from gravitating through the discharge port the vertical conveyor screw has a solid axial core with helical blades united therewith.

A dispensing operation may be controlled manually, for example, by a push button. In institutions such as restaurants and in vending machines the dispensing device operates with an automatic cycle controlled, for example, by a suitable timer.

In all of the automatic devices some kind of flow control is necessary to assure that the powdered material is discharged at a predetermined constant rate during the predetermined dispensing period to result in the dispensing of uniform quantities. It is requisite that the quantity that is dispensed on each operating cycle be adjustable for various reasons, including the reason that different chocolate materials from different sources vary in density and strength of flavor.

A further requisite of primary importance is that powdered chocolate dispensers must be of relatively inexpensive construction. A simple constant speed motor is economical but a variable speed motor or variable speed gearing would be too expensive for the purpose. With a constant speed motor the quantity that is released on each dispensing operation cycle may be controlled either by varying the rate of discharge flow or by varying the duration of the dispensing flow, but in either event satisfactory control of the rate of dispensing flow is necessary.

The difficulty is in accurately controlling the rate at which the powdered material is dispensed by the conveyor screw. One method heretofore employed for controlling the rate at which the powdered material is dispensed by a constant speed screw conveyor is to variably restrict the exit of the powdered material from the dispensing port by some type of valve, for example by a damper-type valve. This approach is not satisfactory because it creates resistance to the movement of the powdered material through the port by the conveyor screw, the resulting back pressure imposing an additional load on the motor which makes it necessary to use a relatively heavy motor at corresponding increase in cost.

The pressing need is to provide some kind of simple, reliable and inexpensive flow regulator that does not increase the load on the motor. It is further desirable that such a flow regulator be subject to precise adjustment to make possible an arrangement in which a constant speed dispensing motor operates for a predetermined time interval and any desired change in the dispensed quantity is accomplished simply by varying the rate of dispensing flow.

The present invention meets all of these requirements.

SUMMARY OF THE INVENTION

The flow regulator of the present invention has one form for use in a horizontal hopper and a second form for use in a vertical hopper or canister. In each instance a simple regulator member is mounted on the conveyor screw for axial adjustment along the conveyor screw by screw action and in both instances variation in the rate of dispensing flow is accomplished by varying the distance of the regulator member from the entrance to the discharge port.

In the horizontal hopper the conveyor screw is a helically coiled rod or rigid polished wire and the flow regulator is a short sleeve that fits inside the coil and is formed with an outer circumferential helical groove for screw engagement with the coil. Axial adjustment is accomplished by rotating the regulator sleeve relative to the conveyor screw, thereby to change its position on the conveyor screw, and a feature of the invention is that the regulator sleeve is adapted for rotation by a simple tool such as a common table knife inserted through the dispenser port.

The conveyor screw propels the powdered material towards the discharge port and spacing of the regulator sleeve from the entrance to the discharge port determines the amount of the moving material that is discharged through the discharge port.

In the vertical hopper or canister that is employed in the second embodiment of the invention, a solid type conveyor screw spans the tubular discharge port to keep all of the powdered content of the canister from gravitating through the port, material being released only when the conveyor screw rotates. The flow regulator is a helical collar that slidingly conforms to the helical groove formed by the helical blade of the conveyor screw. Here again, axial adjustment of the regulator member along the conveyor screw is accomplished by rotation of the regulator member relative to the conveyor screw on which it is mounted.

The helical collar blocks flow of material along the helical groove of the conveyor screw so that any material that gravitates into the tubular discharge port must enter the discharge port through the annular space between the collar and the surrounding conical wall that leads to the port. Thus, the helical collar acts as a valve member to determine the rate of gravitational flow of material into the helical groove of the portion of the conveyor screw that occupies the discharge port.

Both forms of the invention afford close adjustment of the rate of dispensing flow. In each instance, no load is imposed on the motor since the flow regulator merely limits the amount of powdered material that enters the discharge port instead of restricting the amount of material that is released from the discharge port. In each case, the portion of the conveyor screw that rotates in the tubular discharge port operates well below its maximum capacity.

The features and advantages of the invention may be understood from the following detailed description and the accompanying drawings.

BRIEF DESCRIPTION OF THE DRAWINGS

In the drawings, which are to be regarded as merely illustrative:

FIG. 1 is an elevation of the discharge end of a horizontal hopper incorporating the first embodiment of the invention;

FIG. 2 is a fragmentary longitudinal section on an enlarged scale taken as indicated by the line 2—2 of FIG. 1;

FIG. 3 is a sectional view taken along the line 3—3 of FIG. 2, showing how a table knife may be used to adjust the axial position of the regulator member;

FIG. 4 is a side elevation of the regulator member;

FIG. 5 is an elevational view of a hopper in the form of a vertical canister incorporating the second embodiment of the invention;

FIG. 6 is an enlarged section taken as indicated by the line 6—6 of FIG. 5, showing the regulator member in a retracted position to permit a maximum rate of discharge;

FIG. 7 is a similar view with the regulator member advanced to reduce the rate of discharge;

FIG. 8 is an end elevation of the regulator member shown in FIGS. 6 and 7; and

FIG. 9 is a side elevation of the regulator member.

DESCRIPTION OF THE PREFERRED EMBODIMENTS OF THE INVENTION

In FIGS. 1–4, illustrating the first embodiment of the invention, a horizontal hopper generally designated 10 which is open on its upper side and is of the configuration in end view that is shown in FIG. 1, the longitudinal bottom walls of the hopper converging to form a long valley. A conveyor screw 12 in the form of a smooth, polished rod or rigid wire of helical coiled configuration is actuated by a suitable motor (not shown) and extends longitudinally of the valley into a tubular discharge port 14 at the front end of the hopper.

Suitable agitator means (not shown) is mounted on an upper horizontal driven shaft 15 that is journalled in the opposite end walls of the hopper, the agitator means serving to prevent bridging of material in the hopper. This particular embodiment of the invention is employed to dispense powdered chocolate and it is well known that powdered chocolate tends to cake or bridge.

In accord with the teachings of the invention, a regulator member 20 to control the rate of discharge from the port 14 is in the form of a sleeve that is formed with a helical groove 22 to permit the sleeve to be mounted inside the conveyor screw in sliding engagement with the helical turns of the screw. Thus, the regulator member 20 may be adjusted axially of the screw by rotation relative to the screw. The regulator member is preferably made of any suitable plastic that is approved for use with food materials.

As may be seen in FIGS. 2 and 4, the leading end 24 of the regulator member 20 is preferably conformed to a plane perpendicular to the axis of the sleeve. In this particular embodiment of the invention the sleeve-shaped regulator member 20 has a pair of diametrically opposite inner radial lugs 25 to permit the regulator member to be rotatably adjusted by insertion of a suitable tool. FIG. 3 shows in phantom the cross section of a table knife 26 which may be inserted through the discharge port 15 into the conveyor screw 12 and into the interior of the regulator member 20 to engage the two interior lugs 25.

A minor portion of the powdered material that is propelled towards the discharge port 14 by the conveyor screw 12 passes axially through the sleeve-like regulator member 20 but the major portion of the propelled material moves past the outside of the regulator member and enters the discharge port through the clearance space designated "A," the clearance space being defined by the leading end 24 of the regular member and the inner end or entrance 28 of the discharge port.

It is apparent that the volume of the powdered material that flows into the discharge port through the clearance space "A" will depend upon the axial adjustment of the regulator member 20. Thus, adjusting the regulator member axially towards the discharge port from the position shown in FIG. 2 will reduce the dimension of the clearance space A and thus reduce the discharge flow. It is apparent then that adjusting the regulator member 20 forwardly towards the discharge port decreases the proportion of the moving powdered material that passes through the discharge port.

Referring now to the second embodiment of the invention shown in FIGS. 5–9, a hopper 30 is in the form of a vertical canister that is removably supported by a canister shelf 35. The canister 30 has a removable conical bottom section 34 which screws onto the bottom of the canister and normally rests on the canister shelf 32, the conical portion of the section leading to a tubular discharge port 35. In the construction shown the body of the canister 30 is formed with a large opening 36 and is further formed with an external screw thread 38 to cooperate with an internally threaded ring 40. The ring 40 has a radially inward flange 42 which engages a radially outward flange 44 of the bottom section 34 to releasably join the bottom section to the body of the canister.

A vertical conveyor screw 50 driven by a suitable exterior motor 52 extends downwardly into the discharge port 35 as shown in FIGS. 6 and 7. The motor 52 is mounted on the same wall as the canister shelf 32 and the conveyor screw 50 is releasable from the motor to permit removal of the canister when desired. For this purpose the conveyor screw is connected to the motor by a well-known type of releasable coupling 54 which may be manually disengaged in opposition to the pressure of spring means 55.

It is to be noted that the conveyor screw 50 has a solid axial core 56 with a helical blade 58 unitary with the core, the core and helical blade forming a helical groove 60. In the construction shown a collar 62 on the conveyor screw carries an agitator means in the form of a wire having a horizontal arm 64 and a downwardly inclined arm 65. This agitator means keeps the powdered chocolate from caking excessively and continually fluffs the powdered chocolate to cause it to gravitate freely through the conical bottom section to the bottom discharge port. It is to be noted in FIGS. 6 and 7 that the conveyor screw 50 completely spans the interior of the discharge port 35 so that when the conveyor screw is idle the helical blade 58 of the conveyor screw keeps the powdered material from emptying out of the canister through the discharge port.

The flow regulator member in this second embodiment of the invention is a body 70 that is helically shaped and dimensioned for screw engagement with the conveyor screw 50 and completely spans the helical groove 60 of the conveyor screw. In effect, the regulator member 70 functions as a valve member for the purpose of variably restricting the entrance to the downwardly extending discharge port 35. Thus, in a fully restracted position of the regulator member 70 that is shown in FIG. 6, there is maximum freedom for the powdered material to gravitate into the entrance to the discharge port. On the other hand, when the regulator member is advanced along the conveyor screw by screw action to the lower or advanced position shown in FIG. 7, the regulator member restricts the gravitational flow of the powdered material into the entrance of the discharge port 35. Thus, the lower the position of adjustment of the regulator member 70 on the conveyor screw 50, the less the rate of flow through the discharge port when the conveyor screw is actuated. The regulator member 70 may be made of any suitable material but preferably is made of a suitable plastic that is approved for use with food materials.

We claim:
1. In a hopper having a discharge port and a conveyor screw with helical turns extending into the discharge port to move material through the discharge port, the improvement to regulate the rate of discharge of the material comprising:
a flow regulator member inside the hopper spaced from the entrance to the discharge port, said member being mounted on the helical turns of the conveyor screw and being movable axially thereof to cooperate with the entrance to the discharge port to vary the amount of material entering the discharge port.

2. An improvement as set forth in claim 1 in which said regulator member is in screw engagement with the helical turns of the conveyor screw for axial adjustment relative to the conveyor screw in response to rotation of the member relative to the conveyor screw.

3. An improvement as set forth in claim 2 in which said regulator member is in frictional engagement with the conveyor screw for frictionally maintaining any position on the conveyor screw to which it may be adjustable.

4. An improvement as set forth in claim 1 in which the conveyor screw is hollow with an axially extending space and said regulator member is a sleeve for axial movement of a portion of the material therethrough whereby material moves through the regulator member into the discharge port, the remaining portion of the material moving outside of the regulator member and entering the discharge port between the regulator member and the entrance to the discharge port, whereby the spacing of the regulator member from said entrance determines the magnitude of said remaining portion and thereby determines the magnitude of the portion that is discharged through the discharge port.

5. An improvement as set forth in claim 4 in which the conveyor screw is an elongated member of helical configuration and the outside diameter of the regulator member is intermediate the outside diameter and the inside diameter of said helical configuration.

6. An improvement as set forth in claim 5 in which the sleeve has an outer helical groove in sliding engagement with the turns of the conveyor.

7. An improvement as set forth in claim 4 in which the inner circumference of the regulator member is non-circular to permit rotary adjustment of the regulator member to be accomplished by inserting a tool through the discharge port and through the interior of the conveyor screw into the sleeve.

8. An improvement as set forth in claim 7 in which the sleeve has radially inward projections for engagement by the tool.

9. An improvement as set forth in claim 1 in which the hopper extends vertically and the discharge port is at the lower end of the hopper, the conveyor screw being substantially vertical, and in which the conveyor screw has an axial core with a helical blade unitary therewith forming a helical groove;
and in which said regulator member is of helical configuration conforming to the helical configuration of the groove, the regulator member being slidingly mounted in the groove to block movement of the material along the groove whereby the only path of flow of the material into the discharge port is the path of gravitational flow through the annular space between the regulator member and the entrance to the discharge port.

10. An improvement as set forth in claim 9 in which the outside diameter and inside diameter of the regulator member are approximately the outside diameter and the inside diameter respectively of the helical groove of the conveyor screw.

11. An improvement as set forth in claim 9 in which the discharge port is tubular and in which the conveyor screw spans the discharge port to block free gravitational flow therethrough when the conveyor screw is idle.

12. An improvement as set forth in claim 9 in which the bottom portion of the hopper tapers to the discharge port.

13. An improvement as set forth in claim 12 in which agitator means carried by the conveyor screw extends into the lower region of the hopper that is defined by the tapered bottom portion of the hopper to encourage gravitational movement of the material to said annular space.

References Cited
UNITED STATES PATENTS

| | | | |
|---|---|---|---|
| 2,055,725 | 9/1936 | Johnson | 198—64 |
| 2,569,969 | 10/1951 | Baer | 198—64 |
| 2,988,249 | 6/1961 | Wahl | 198—64 X |

STANLEY H. TOLLBERG, Primary Examiner

U.S. Cl. X.R.
198—64